United States Patent

Magill et al.

[11] Patent Number: 5,966,418
[45] Date of Patent: Oct. 12, 1999

[54] METHOD FOR THE DESTRUCTION OF PLUTONIUM BY IRRADIATION IN A LIGHT WATER REACTOR

[75] Inventors: Joseph Magill, Karlsruhe; Hansjoachim Matzke, Weingarten; George Nicolaou, Ettlingen; Paolo Peerani, Leopoldshafen; Jacques Van Geel, Ettlingen-Oberweier, all of Germany

[73] Assignee: European Atomic Energy Community, Luxembourg

[21] Appl. No.: 08/983,221

[22] PCT Filed: Jul. 3, 1996

[86] PCT No.: PCT/EP96/02915

§ 371 Date: Jan. 5, 1998

§ 102(e) Date: Jan. 5, 1998

[87] PCT Pub. No.: WO97/02575

PCT Pub. Date: Jan. 23, 1997

[30] Foreign Application Priority Data

Jul. 4, 1995 [EP] European Pat. Off. .............. 95110397

[51] Int. Cl.⁶ ........................................ G21C 1/08
[52] U.S. Cl. ............................ 376/170; 376/171
[58] Field of Search ..................... 376/170, 171, 376/172, 173, 158, 267

[56] References Cited

U.S. PATENT DOCUMENTS

| 4,278,559 | 7/1981 | Levenson et al. | 252/636 |
| 5,419,886 | 5/1995 | Grantham et al. | 423/251 |
| 5,513,226 | 4/1996 | Baxter et al. | 376/170 |
| 5,737,375 | 4/1998 | Radkowsky | 376/173 |

FOREIGN PATENT DOCUMENTS

| 6-347579 | 12/1994 | Japan | G21C 5/00 |

*Primary Examiner*—Daniel D. Wasil
*Attorney, Agent, or Firm*—Sughrue, Mion, Zinn, Macpeak & Seas, PLLC

[57] ABSTRACT

This invention relates to a method for the destruction of plutonium (Pu) by irradiation in a light water reactor (LWR). According to the invention Pu is mixed with highly enriched uranium (U) in roughly equal weight proportion rates. This mixture is embedded in an inert matrix of a material whose components have an atomic number significantly lower than 92. LWR fuel pins are then produced therefrom and these pins are inserted in a LWR in place of certain normal LWR fuel pins. The irradiation time of the fuel pins containing Pu is significantly longer than that of said normal pins. The irradiation is preferably repeated after about 200 years without any reprocessing of the spent fuel.

9 Claims, 5 Drawing Sheets

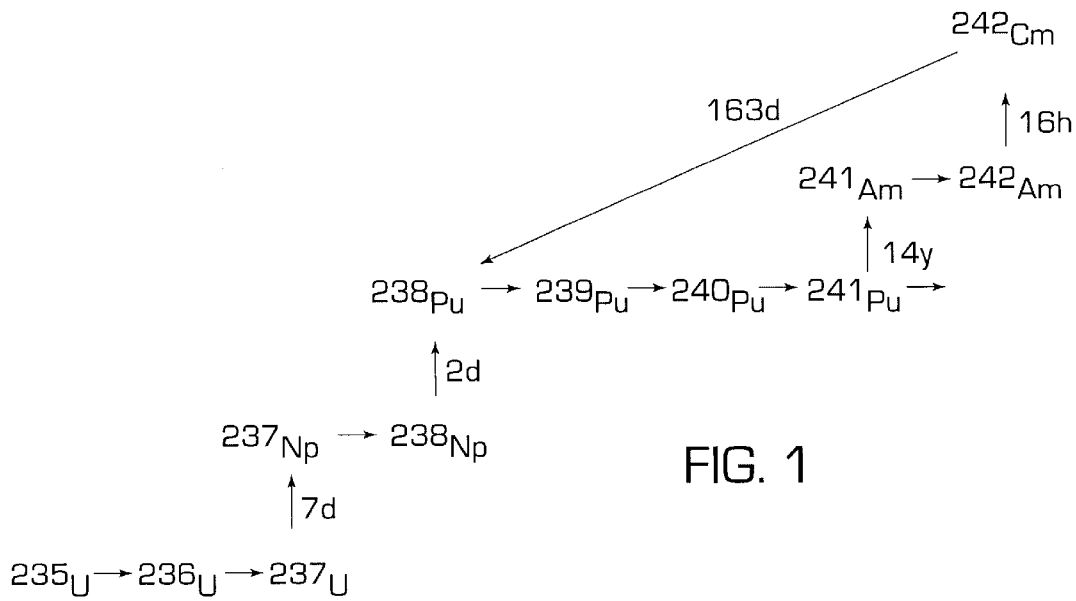
FIG. 1
FIG. 2
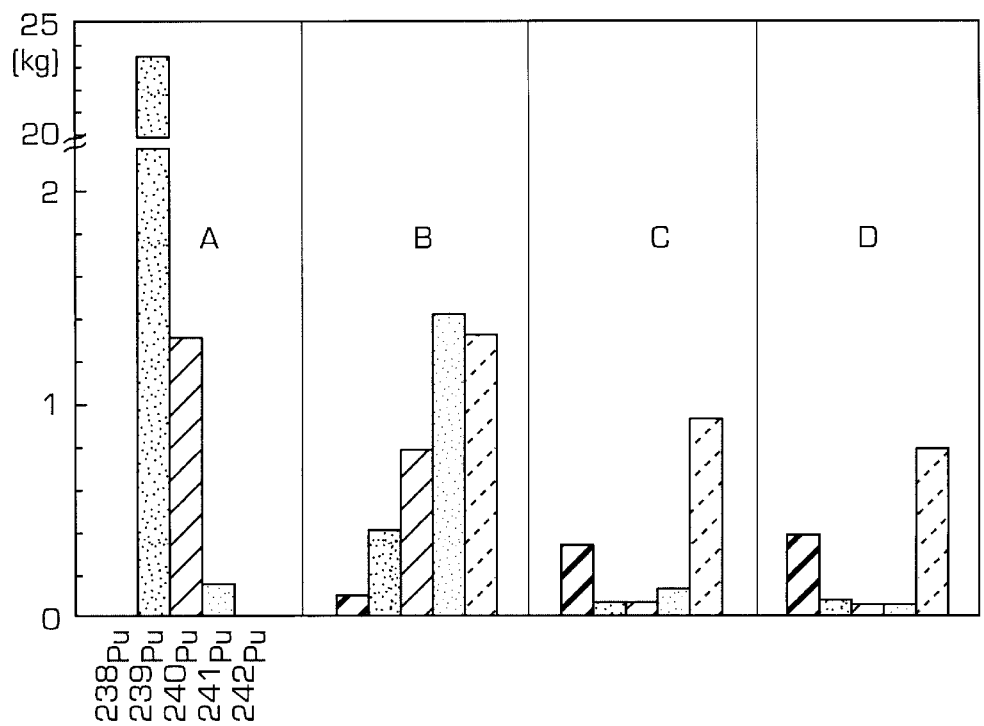

METHOD FOR THE DESTRUCTION OF PLUTONIUM BY IRRADIATION IN A LIGHT WATER REACTOR

This invention concerns the destruction of plutonium, especially of weapons grade plutonium.

The relaxation in tension between the United States and the former Soviet Union, witnessed over the past few years, has given rise to tens of thousand of nuclear warheads on both sides which have been declared excess to current needs. According to a recently published U.S. National Academy of Sciences report on Management and Disposition of Excess Weapons Plutonium, the excess amounts to 50 tons of weapons grade plutonium (W-Pu) in the U.S.A. At a recent NATO Advanced Research Workshop on managing the plutonium surplus Russian experts consider the Russian excess of W-Pu to be 100 tons.

At present W-Pu and highly enriched uranium (W-U) are present in warheads and will have to be transferred for dismantling. In this process a major problem will arise with regard to proliferation of nuclear weapons to national powers or sub-national groups by theft or unauthorised diversion.

One option is to dispose of this material by "burning" it in nuclear reactors and this is the subject of the present invention. The problem with this approach is the fact the even the "ashes" resulting from burning of W-Pu (i.e. the spent fuel) can be used to make a nuclear explosive. Following irradiation in the reactor, the spent fuel can be removed from the reactor, dissolved, and chemically processed to separate the plutonium which could then be used to construct a nuclear device. The compositions of different types of uranium and plutonium are given in tables I and II.

Although more difficult than with W-Pu, reactor plutonium (R-Pu) can be used to construct a nuclear explosive. It should be noted that although the critical mass of R-Pu is greater than that of W-Pu (see table III), the critical mass of R-Pu is less than that for weapons grade uranium (W-U). In addition, heat generation in R-Pu is about a factor five higher than in W-Pu and the spontaneous emission of neutrons is about a factor 6 higher than in W-Pu. In table III a summary of critical masses, heat production and neutron emission rates is given for various isotopes and isotope mixtures.

Accordingly the present invention intends to optimise the destruction rate of Pu and increase the proliferation resistance of spent fuel by increasing the relative amounts of the isotope $^{238}$Pu present in the "ash". Another aim is to avoid any reprocessing of the irradiated plutonium. These aims are achieved according to the invention by the method as defined in claim 1. As far as features of a preferred embodiment of this method are concerned reference is made to the secondary claims.

The use of weapons grade U requires an extended burnup to avoid proliferation problems associated with $^{235}$U in the spent fuel. Only after about 2000 days irradiation in a PWR neutron spectrum (total flux=$3\times10^{14}$cm$^{-2}$s$^{-1}$) is the percentage of $^{235}$U in the uranium less than 20% i.e. the concentration below which enriched uranium is not considered as a proliferation risk (the bare critical mass of a 20% mixture of $^{235}$U in $^{238}$U is approximately one ton). This long irradiation, of course, then leads to a high level of Pu destruction.

The invention will now be described in more detail by means of a preferred embodiment and the annexed drawings.

FIG. 1 shows the main pathways for the production of $^{238}$Pu from $^{239}$Pu and $^{235}$U.

FIG. 2 shows the Pu isotopic masses per ton of matrix: in fresh fuel (A) and after 1, 2, and 2.3 cycles (B, C, D respectively) in a PWR (one cycle=878 days). Fresh fuel contains 2.5% W-Pu+2.5% W-U in an inert matrix.

FIG. 3 shows the U isotopic masses per ton of matrix: in fresh fuel (A) and after 1, 2, and 2.3 cycles (B, C, D respectively) in a PWR (one cycle=878 days). Fresh fuel contains 2.5% W-Pu+2.5% W-U in an inert matrix.

Figure 9:
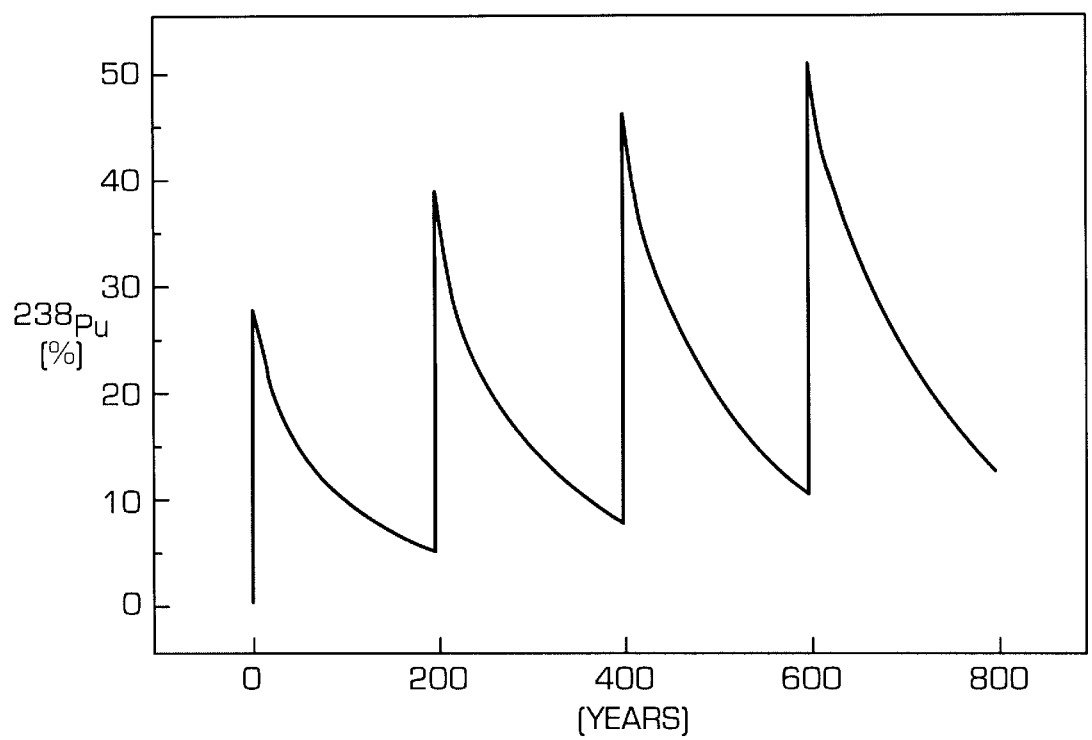

FIG. 9 shows the percentage of $^{238}$Pu in total Pu resulting from irradiation and decay of an inert matrix containing 2.5% W-Pu+2.5% W-U. Initially, the fresh matrix is irradiated for 2000 days. At 200, 400, and 600 years, the matrix is re-irradiated for 1000 days.

Figure 10:
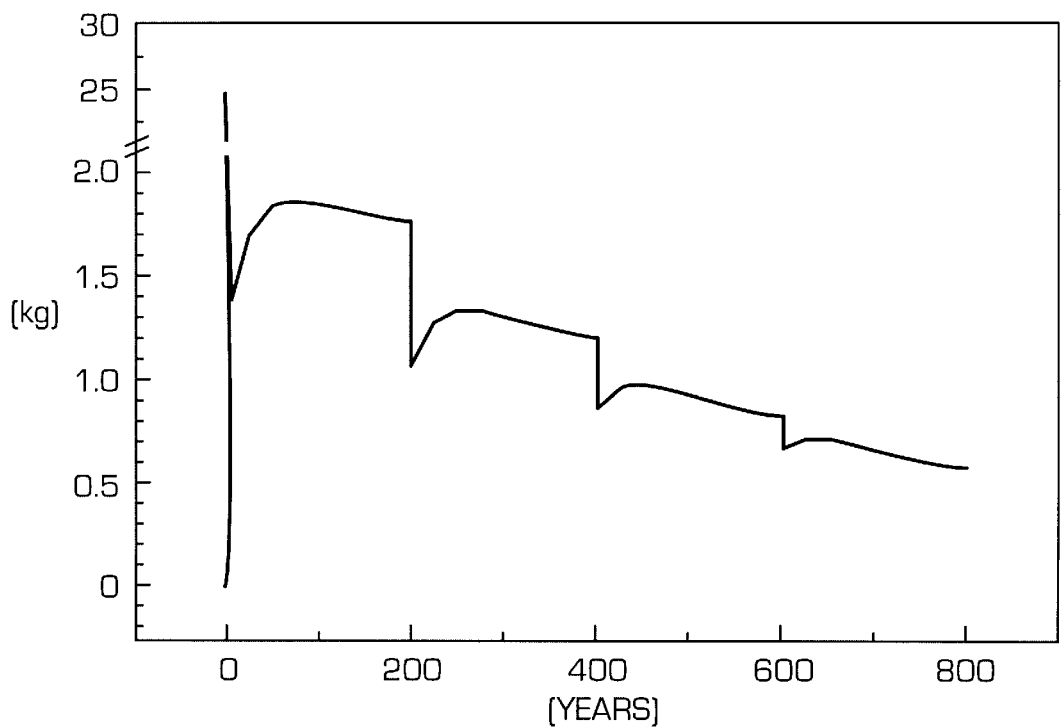

FIG. 10 shows the total mass of Pu isotopes resulting from irradiation and decay of an inert matrix containing 2.5% W-Pu+2.5% W-U. Initially, the fresh matrix is irradiated for 2000 days. At 200, 400, and 600 years, the matrix is re-irradiated for 1000 days.

The burnup calculations are based upon a standard pressurised water reactor with 3.2% $^{235}$U initial fuel enrichment, power level of 37.5 MW/ton, and burnup of 33 GWd/ton (achieved after 879 EFPD-effective full power days). To simulate the irradiation of a pin with a different fuel in this reactor, the following procedure was adopted: An initial calculation was made for the standard fuel configuration (i.e. 3.2% $^{235}$U, 33 GWd/t) to determine the average neutron flux during irradiation.

Using this average neutron flux and the same one group cross sections (thereby ensuring that the neutron flux and spectrum correspond to a 3.2% $^{235}$U enriched fuel with a burnup of 33 GWd/t over 879 EFPD), a new fuel configuration can be defined e.g. inert matrix plus fissile material or as MOX, and the calculations are then repeated for the irradiation period of 879 EFPD.

A difficulty which arises with the above procedure is that in the initial calculation burnup dependent cross sections are used to account for changes in the neutron energy spectrum brought about by the buildup of additional fissionable isotopes. Depending on the burnup, different cross sections are used especially for the plutonium isotopes. If a different fuel type such as the inert matrix-based fuel is used, the code assumes the core consists entirely of this material. The burnup of this material in the previously defined neutron energy spectrum is clearly different from the standard fuel but it is the inert matrix-based fuel which determines the burnup and therefore which cross sections are to be used.

This problem can be overcome by using burnup independent cross sections. The burnup independent cross sections have been obtained by linearly averaging the burnup dependent cross sections as shown in table IV. Using these averaged cross sections then ensures that the material to be irradiated has no effect on the cross sections used. Clearly, there is no difficulty in extending the calculations to 1757 and 2000 days.

Figure 3:
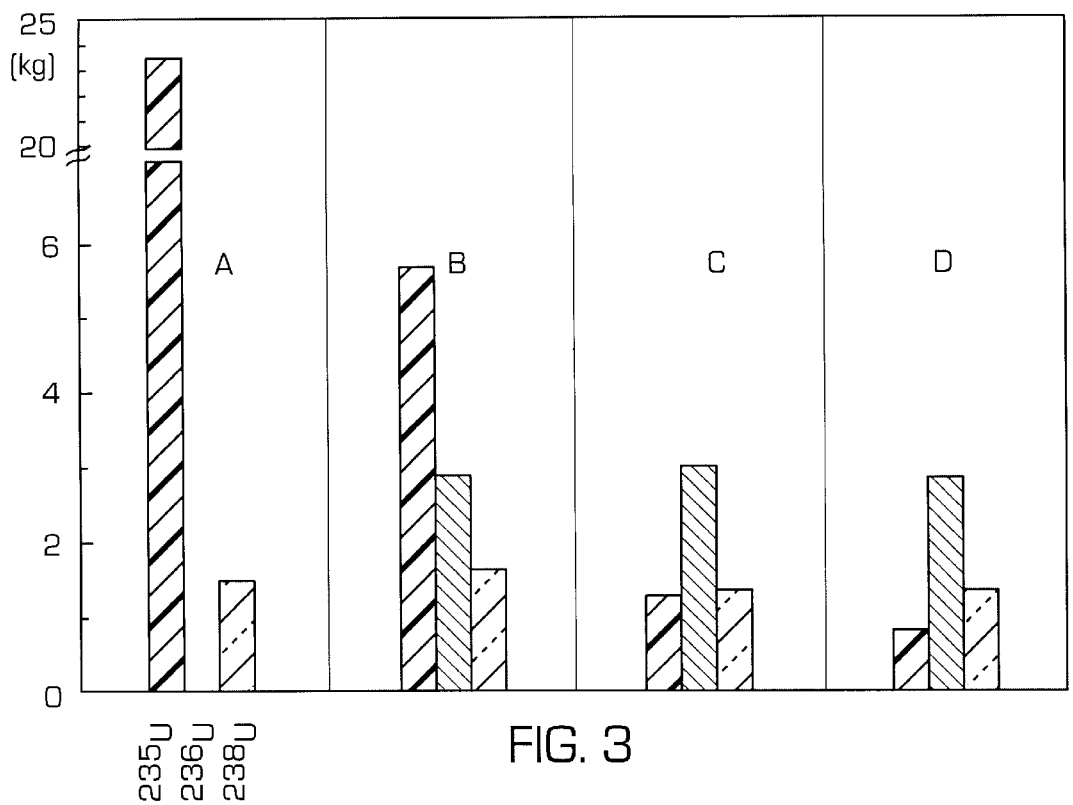

Now, the evolution during irradiation of an inert matrix based fuel pin containing 2.5% W-Pu and 2.5% W-U in a PWR will be considered. It is assumed, for simplicity, that the inert matrix has the same density as that of the standard fuel. The relevant details of the PWR have been described in the previous section. It is also assumed that the presence of the inert matrix plus fissile material does not disturb the neutron spectrum of the reactor. The results of such an irradiation are shown in FIGS. 2 and 3 and summarised in Table V for the plutonium and uranium isotopes. Here the masses of isotopes present per ton of inert matrix are given at various irradiation times.

Figure 4:
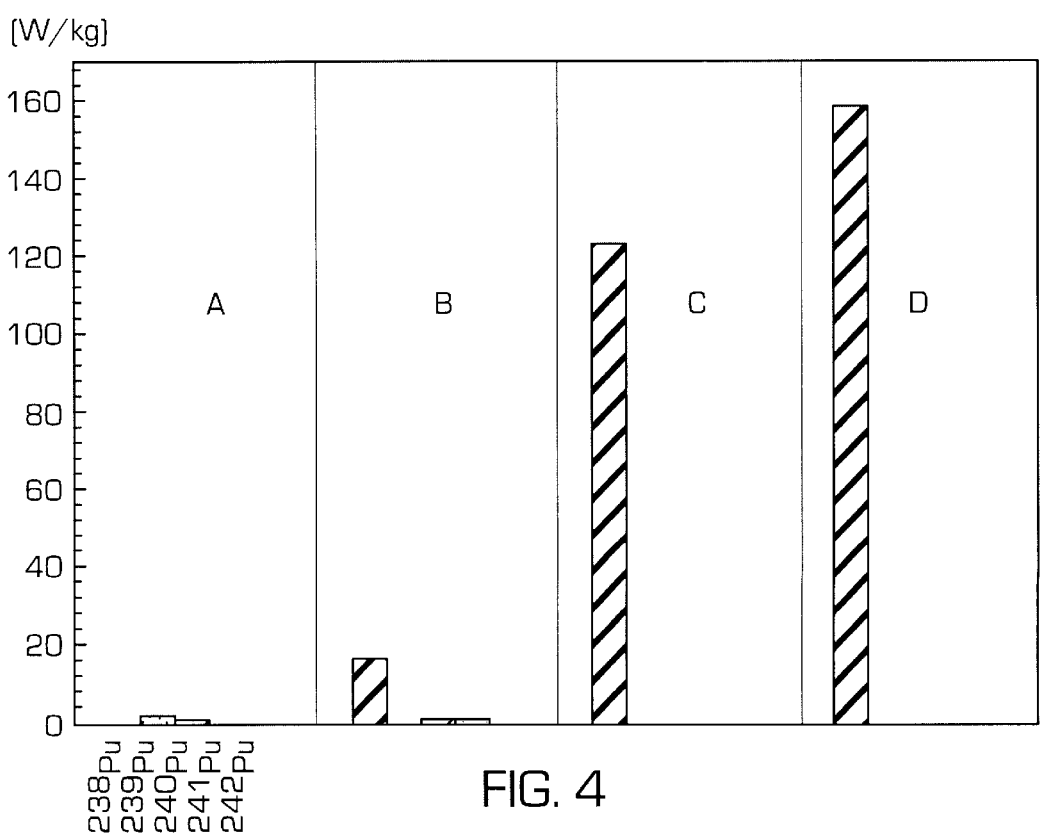
FIG. 4 shows isotopic heating rates per unit mass of total Pu: for fresh fuel (A) and after 1, 2, and 2.3 cycles (B, C, D respectively) in a PWR.

As can be seen from FIG. 3 and Table V, an irradiation time of approximately 2.3 cycles (2.3×879 days) of the W-U is required to ensure that less than 20% of the total uranium is $^{235}$U. This consideration of the proliferation resistance of the W-U thereby fixes the irradiation time for the matrix. During this irradiation period, the plutonium isotope distribution shifts almost entirely to $^{242}$Pu. The large amounts of $^{238}$Pu present originate from the irradiation of the W-U. Also from table V, approximately 94% of the total plutonium has been destroyed over 2.3 cycles. What remains is mostly the isotope $^{242}$Pu (which from table III has a critical mass of 100 kg) with approximately 28% $^{238}$Pu. If the spent fuel were to be reprocessed to separate out the plutonium, very high heating rates in excess of 150 W/kg of Pu metal are to be expected as can be seen in FIG. 4. Since the critical mass of this mixture is approximately 50 kg, heating rates of 7.5 kW per device will have to be contended with. Clearly, from this result the amounts of W-U present in the fresh matrix could be considerably reduced.

Figure 5:
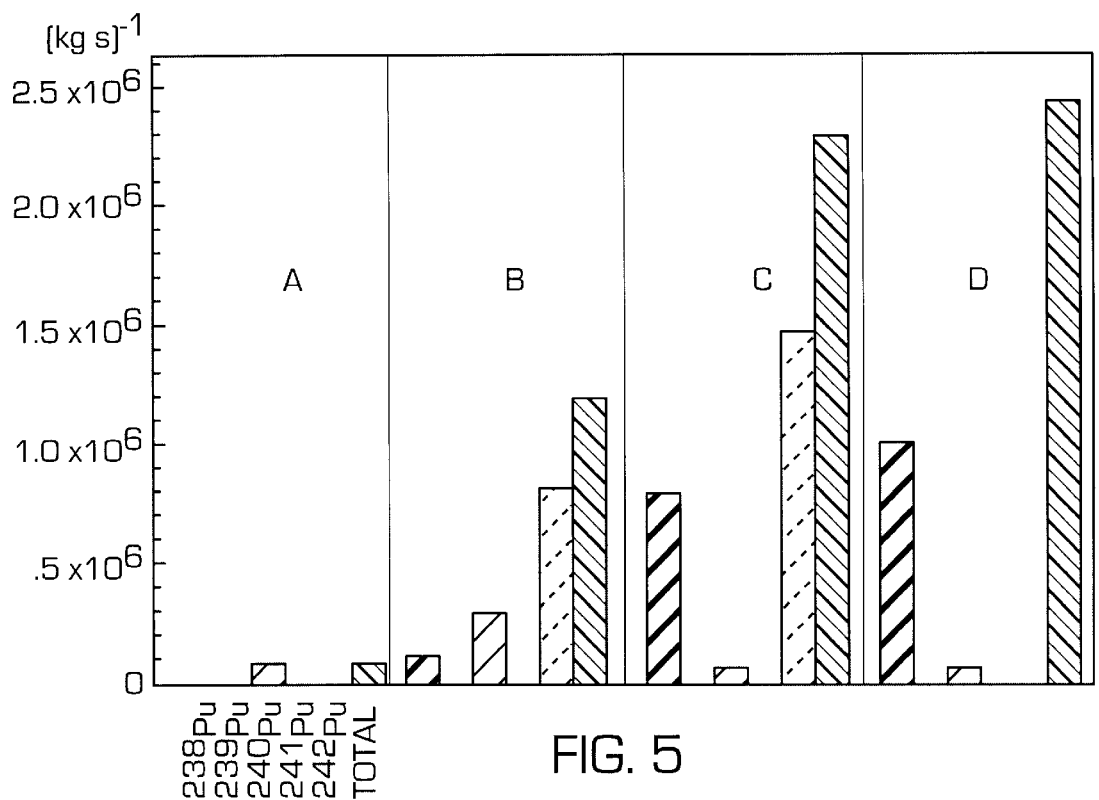
FIG. 5 shows isotopic neutron emission rates per unit mass of total Pu: for fresh fuel (A) and after 1, 2, and 2.3 cycles (B, C, D respectively) in a PWR.

The neutron emission rates from such chemically separated plutonium are shown in FIG. 5. After 2.3 cycles the neutron emission rate is a factor 32 higher than from W-Pu but only a factor of 2 higher than from R-Pu which is obtained by reprocessing the fuel after 1 cycle.

In the calculations it was assumed that the presence of inert matrix based fuel pins did not disturb the neutron flux in the reactor. This is only true provided that the variations for the standard and inert matrix based fuels are not too different. In this section the $k_\infty$ variations resulting from the irradiation of standard and inert matrix based fuels will be studied.

Figure 6:
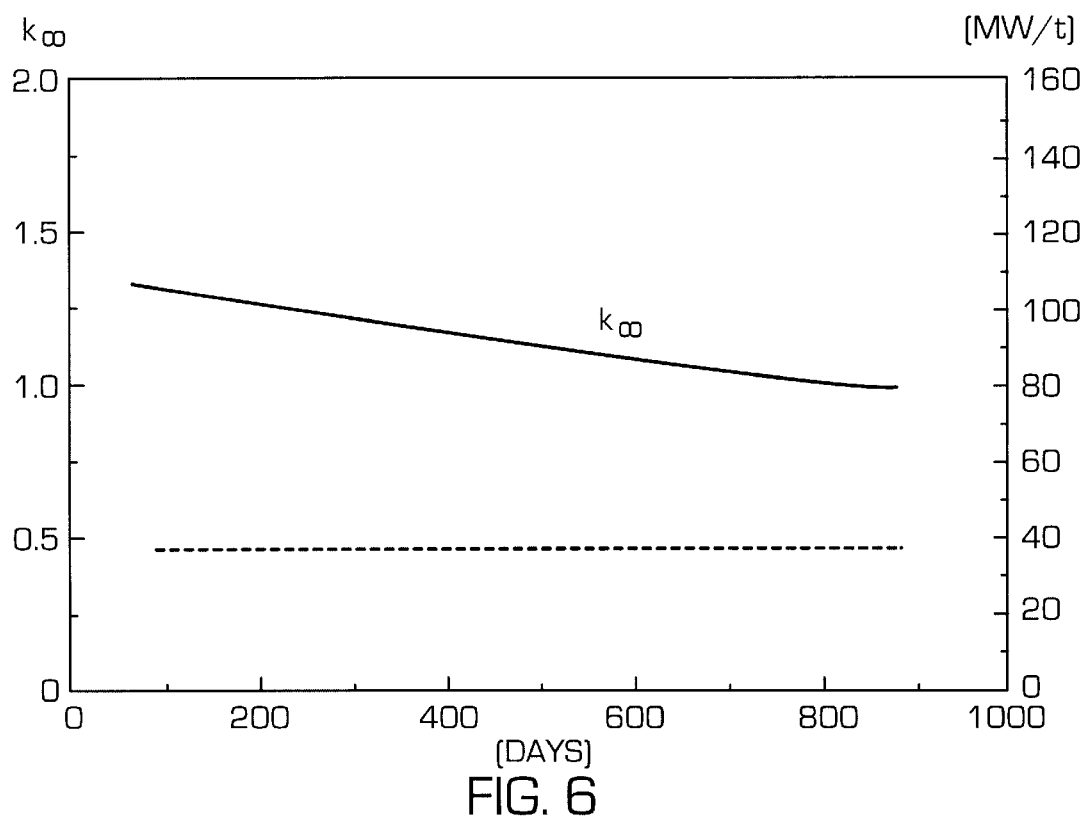
FIG. 6 shows the variation of $k_\infty$ and average power with time for a standard PWR fuel.
Figure 7:
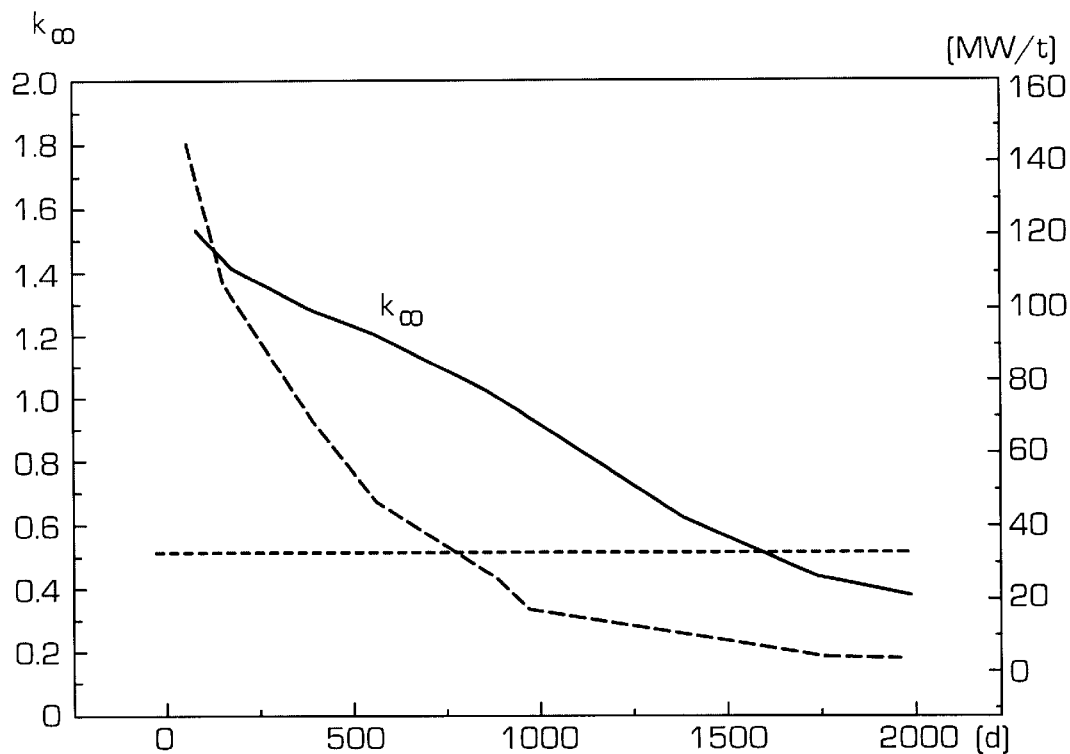
FIG. 7 shows the variation of $k_\infty$ and power with time for the inert matrix based fuel in a standard PWR neutron spectrum.

In FIG. 6 the variation of $k_\infty$ of the standard fuel configuration (described in the previous section) of 3.2% $^{235}$U in a natural U matrix is shown over one cycle (i.e. 879 days). Also shown is the average thermal power generated. The variation of $k^\infty$ of an inert matrix containing 2.5% W-Pu and 2.5% W-U in a neutron flux of the LWR is shown in FIG. 7. The irradiation time extends to 2000 days corresponding to 2.3 cycles of the LWR. Clearly, large variations in $k_\infty$ can be seen. Indeed after about 900 days irradiation the configuration inert matrix plus fissile material becomes subcritical. It should be noted here that although $k_\infty<1$ this material is still producing net energy with a multiplication factor M of approximately $1/(1-k^\infty)$.
Such an irradiation can in fact be accomplished within a LWR with a standard fuel life of 879 days: One possible scheme is to consider the core composed of an inner core and an outer blanket with the following properties:

the inner (critical) core contains standard and inert matrix fuel pins with $k_\infty>1$.

an outer (sub-critical) blanket contains irradiated inert matrix fuel pins with $k_\infty<1$. In steady operation of the reactor, after each 293 days (one third of a standard cycle):

one third of the standard pins (i.e. those which have been in the reactor for 879 days) are removed from the reactor core and replaced by fresh pins, one third on the inert matrix fuel pins irradiated in the central core for 879 days are removed to the blanket where they remain for another 1.3 cycle irradiation. These inert matrix pins are replaced by fresh inert matrix pins, one quarter of the inert matrix pins in the outer blanket of the reactor are removed (these pins have been in the reactor for a period of 7×293=2050 days) from the reactor.

Such a scheme will ensure that the standard pins are in the reactor for 878 days whereas the inert matrix pins are in the reactor for the required 2050 days. It is not a requirement that the outer blanket should contain the sub-critical inert matrix based pins. Depending on the neutron distribution, this array of sub-critical pins could be placed in an annular cylinder in the core region or dispersed through the core.

Figure 8:
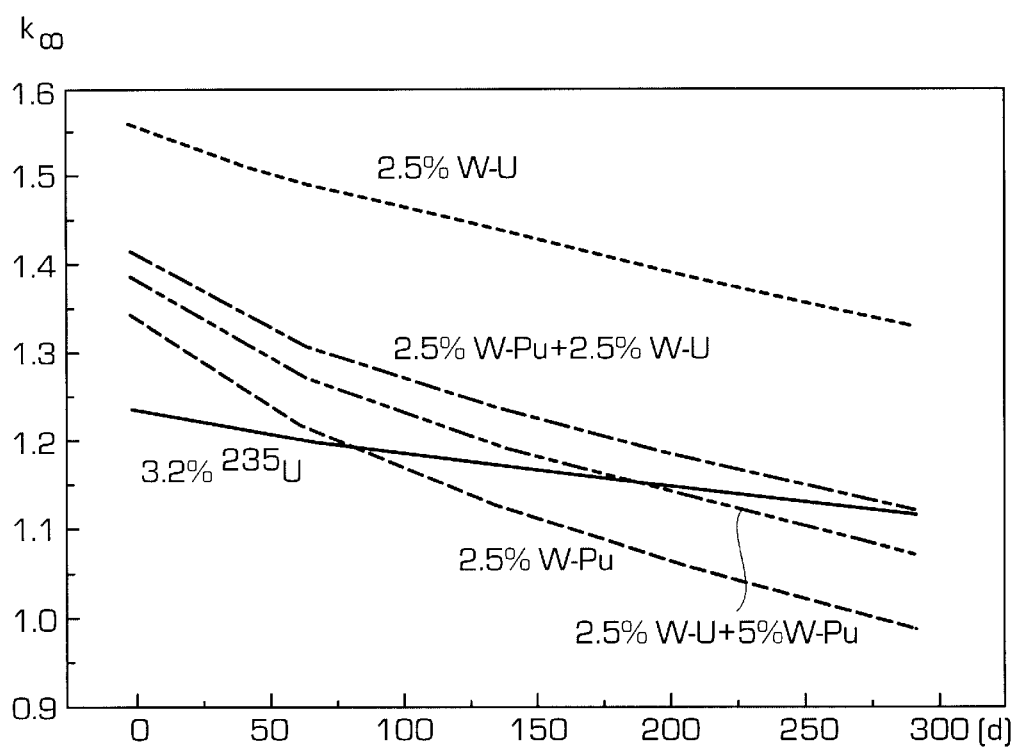
FIG. 8 shows the variation of $k_\infty$ with time for different fuels and mixing ratios of W-Pu and W-U.

The above heterogeneous core layout cannot be investigated with a zero dimensional code. However, an approximate treatment of such a heterogeneous core can be made by considering a homogeneous core containing fuel at different stages of irradiation. Hence a standard core can be considered as containing fuel—one third of which is fresh, one third has been irradiated for 293 days and one third irradiated for 586 days. The variation of $k_\infty$ over one third of a cycle i.e. 293 days is shown in FIG. 8. Similarly, one can consider a core consisting of inert matrix based fuel. Since the fuel here is in the reactor for seven periods of 293 days (≈2000 days), the homogeneous material contains a mixture, one seventh of which is fresh, one seventh irradiated to 293 days, one seventh irradiated to 586 days, etc. Notice that this core is being irradiated with the spectrum of the standard PWR. Provided that the variation of $k_\infty$ with time is not too different from that of the standard PWR, this should be a reasonable approximation. The extent to which this is the case may be seen in FIG. 8. Here it can be seen that by varying the amounts of fissile material i.e. W-Pu and W-U, the ratio W-Pu:W-U, and through the use of a burnable neutron absorber, the variation of $k^\infty$ can be approximated to that of the standard reactor.

A given amount of weapons grade material is contained in a volume of inert matrix. If the density of the inert matrix were the same as that of the $UO_2$ fuel, then approximately 50 kg of W-Pu per ton of matrix (i.e. 5% assuming equal densities) is required for equivalent power production.

The inert matrix is a material which replaces conventional $UO_2$. It should not form actinides by neutron capture, but otherwise have properties similar to or superior to those of $UO_2$. To avoid actinide formation, the atomic number of all components should be significantly less than 92. To have good reactor properties, the melting point $T_m$ should be high (greater than 2000C.; for $UO_2$ $T_m$=2880C.), the thermal conductivity and mechanical properties should be equivalent to those of $UO_2$, and the matrix should be compatible with the cladding and coolant. Finally, it should not have a high neutron capture cross section in order to obtain good neutron economy.

Two classes of ceramics can be selected which meet these criteria. One class contains $Al_2O_3$, spinel ($MgAl_2O_4$), or MgO which have no solid solubility for actinides. In this case, a two phase heterogeneous fuel will result with $UO_2$ or $PuO_2$ particles in the inert matrix. The second class contains $CeO_2$, and zircon ($ZrSiO_4$), and shows solid solubilities high enough to allow fabrication of a homogeneous fuel.

Because the half life of $^{238}$Pu is 87.75 years, the proliferation resistance of the spent inert matrix-based fuel will decrease with time. After approximately 200 years the level of $^{238}$Pu in the Pu is less than 5% as can be seen in FIG. 9. If at this time the spent fuel is still considered a proliferation risk, one need only re-irradiate the material again without reprocessing. The result of doing this every 200 years up to 800 years is shown in FIG. 9. The neutron flux used here is that of the standard PWR. Finally, in FIG. 10 the variation of the total Pu mass is shown resulting from a series of irradiation and decay steps over a period of 800 years—starting with the fresh W-Pu in the inert matrix. The fresh matrix is irradiated for 2000 days. At 200, 400, and 600 years the matrix is re-irradiated for 1000 days. From FIG. 10 it can be seen that following an irradiation step, in which the total Pu decreases rapidly, the total Pu increases. This is due to the increasing amounts of $^{240}$Pu which arise from $^{244}$Cm formed during the irradiation step which then decays with a half-life of about 18 years.

The main characteristics of this method according to the invention are that it provides a high destruction level of the W-Pu and a high proliferation resistance of the spent fuel ashes in a once through cycle. Proliferation resistance of the spent fuel is considerably increased by the use of highly enriched U in the fresh fuel. The presence of this uranium leads to an additional source of $^{238}$Pu which, after irradiation for 2000 days, forms approximately 30% of the total plutonium. In contrast to alternative methods for increasing the amounts of $^{238}$Pu in the spent fuel, which are based on the use of $^{237}$Np or $^{236}$U obtained by reprocessing, the present method requires no reprocessing of the inert matrix-based fuel. The requirement of an irradiation time of approximately 2000 days in the reactor ensures that less that 20% of the total uranium remaining is $^{235}$U, thereby overcoming a potential proliferation problem with the irradiated uranium (notice that the 20% level applies to separated uranium; in the present case, since this is mixed with alpha active waste, the 20% level could be significantly increased implying an irradiation time less than 2000 days).

Finally, since $^{238}$Pu has a half-life of approximately 88 years, the proliferation risk of the spent matrix based fuel will decrease with time. Over a period of 200 years the level of $^{238}$Pu in the plutonium will drop below 5%—the minimum value required for proliferation resistance. The advantage of the present scheme is that the high level of $^{238}$Pu can be restored by re-irradiating the spent matrix for a further period of 1000 days. The process of re-irradiation and decay can be repeated, without reprocessing, for as long as the spent matrix is considered a proliferation risk.

The invention is not restricted to the method as described above in detail. In particular, it is not necessary to mix W-U with the W-Pu to be destroyed. One could equally use enriched uranium with an $^{235}$U content down to 20% in which case the quantity of newly generated plutonium is considerably lower. Further this method applies also to the destruction of plutonium which does not stem from warheads but from spent LWR fuel or from other nuclear installations.

TABLE I

Composition (%) of different types of uranium

|  | $^{235}$U | $^{238}$U |
|---|---|---|
| Natural Uranium | 0.7 | 99.3 |
| Weapons Grade Uranium (W-U) | 93.5 | 6.5 |

TABLE II

Composition (%) of different types of plutonium

|  | $^{238}$Pu | $^{239}$Pu | $^{240}$Pu | $^{241}$Pu | $^{242}$Pu |
|---|---|---|---|---|---|
| MOX Grade Plutonium (R-Pu)* | 1.34 | 62.77 | 23.48 | 8.31 | 4.1 |
| Weapons Grade Plutonium (W-Pu) | 0 | 94 | 5.3 | 7 | 0 |

*Plutonium recovered from uranium pressurised water reactor fuel with burnup 33GWd/t

TABLE III

Critical masses, neutron emission and heat generation rates of various isotopes and mixtures[3,4]

| Isotope | $t_{1/2}$ (y) | Bare critical mass (kg) | Sp. Neutron Emission Rate (kgs)$^{-1}$ | Isotopic Power (W kg$^{-1}$) |
|---|---|---|---|---|
| $^{235}$U | 7.04 × 10$^8$ | 49 | 0.4 | ≅0 |
| $^{238}$U | 4.47 × 10$^9$ | — | 15 | ≅0 |
| $^{238}$Pu | 87.7 | 9/15* | 2.32 × 10$^6$ | 560 |
| $^{239}$Pu | 2.41 × 10$^4$ | 10/15* | 29 | 1.9 |
| $^{240}$Pu | 6.54 × 10$^3$ | 40/60* | 9.24 × 10$^5$ | 6.8 |
| $^{241}$Pu | 14.4 | 12/15* | 49 | 4.2 |
| $^{242}$Pu | 3.76 × 10$^5$ | 90/177* | 1.85 × 10$^6$ | 0.1 |
| $^{241}$Am | 432 | 114 | 1.55 × 10$^3$ | 114 |
| W-Pu | — | ≅11 | 5 × 10$^4$ | 2.2 |
| R-Pu | — | 15 | 3.2 × 10$^5$ | 10.7 |
| W-U | — | 52 | 1.3 | ≅0 |

*α/δ phases of Pu

TABLE IV

One group burnup dependent and averaged cross sections for a PWR

| | | Cross sections (barns) for fuel burnup (MWd/g-atom heavy metal) of: | | | | | |
|---|---|---|---|---|---|---|---|
| Nuclide | Reaction | 0.0 | 2.0 | 4.0 | 6.0 | 8.0 | Average |
| $^{239}$Pu | capture | 69.09 | 64.31 | 59.93 | 55.85 | 52.05 | 60.3 |
| $^{239}$Pu | fission | 121.1 | 113.7 | 106.7 | 100.2 | 94.07 | 107.2 |
| $^{240}$Pu | capture | 222.8 | 176.2 | 139.4 | 110.2 | 87.17 | 147.2 |
| $^{241}$Pu | capture | 42.02 | 40.23 | 38.51 | 36.87 | 35.29 | 38.6 |
| $^{241}$Pu | fission | 125.9 | 121.4 | 117 | 112.8 | 108.7 | 117.2 |
| $^{242}$Pu | capture | 33.2 | 32.4 | 31.63 | 30.87 | 30.13 | 31.7 |
| $^{241}$Am | capture | 95.7 | 90.28 | 85.17 | 80.35 | 75.18 | 85.5 |

TABLE V

Evolution of an inert matrix containing 2.5% W-Pu + 2.5% W-U in the neuron spectrum of a PWR (1 cycle = 879 EFPD). Densities of matrix and standard fuel are assumed equal

|  | fresh | 1 cycle | 2 cycle | 2.3 cycle |
|---|---|---|---|---|
| total U | 25 kg | 10.2 kg | 5.8 kg | 5.3 kg |
| $^{235}$U/U | 94% | 55% | 23% | 17% |
| total Pu | 25 kg | 4.1 kg | 1.6 kg | 1.4 kg |
| $^{238}$Pu/Pu | 0 | 2.9% | 22% | 28% |

We claim:

1. A method for the destruction of plutonium (Pu) by irradiation in a light water reactor (LWR), comprising mixing Pu with highly enriched uranium (U) in roughly equal weight proportion rates, embedding the resulting mixture in an inert matrix of a material whose components have an atomic number lower than 92 so as to avoid actinide formation, producing LWR fuel pins therefrom, inserting these pins in a LWR in place of certain normal LWR fuel pins, and irradiating the fuel pins containing Pu for more than 1000 days.

2. A method according to claim 1, comprising re-irradiating the fuel pins containing Pu in a LWR after decay periods of about 200 years.

3. A method according to any one of claims 1 or 2, wherein the Plutonium that is destroyed is weapon grade Plutonium.

4. A method according to claim 1, wherein the content of $^{235}$U in the Uranium which is mixed with the Plutonium to be destroyed is at least 20%.

5. A method according to claim 2, wherein the content of $^{235}$U in the Uranium which is mixed with the Plutonium to be destroyed is at least 20%.

6. A method according to claim 3, wherein the content of $^{235}$U in the Uranium which is mixed with the Plutonium to be destroyed is at least 20%.

7. A method according to claim 4, wherein the Uranium is weapon grade.

8. A method according to claim 5, wherein the Uranium is weapon grade.

9. A method according to claim 6, wherein the Uranium is weapon grade.

\* \* \* \* \*